United States Patent
Kronenberg et al.

(10) Patent No.: US 6,710,488 B2
(45) Date of Patent: Mar. 23, 2004

(54) ELECTRIC MOTOR, IN PARTICULAR A FAN MOTOR

(75) Inventors: Klaus Kronenberg, Sulzbach (DE); Frank Jansa, Frankfurt (DE); Klaus Kriessler, Oberursel (DE); Heinrich-Jochen Blume, Darmstadt (DE); Henry Strobel, Sulzbach (DE); Albert Stolzlechner, Heusenstamm (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/873,115

(22) Filed: May 31, 2001

(65) Prior Publication Data

US 2003/0094868 A1 May 22, 2003

(30) Foreign Application Priority Data

Jun. 7, 2000 (DE) .......................... 100 27 614

(51) Int. Cl.[7] ............................................... H02K 5/16
(52) U.S. Cl. ........................................... 310/90; 310/51
(58) Field of Search .......................... 310/90, 51, 67 R

(56) References Cited

U.S. PATENT DOCUMENTS

| | | | |
|---|---|---|---|
| 3,513,339 A | 5/1970 | Harris | 310/90 |
| 3,720,852 A | 3/1973 | Kappius | 310/90 |
| 3,749,457 A | 7/1973 | Latussek | 308/58 |
| 5,204,567 A | 4/1993 | Kinoshita | 310/90 |
| 5,727,071 A | * 3/1998 | Suzuki | 381/71.8 |

FOREIGN PATENT DOCUMENTS

| | | | |
|---|---|---|---|
| DE | 2016866 | 10/1971 | |
| DE | 2101167 | 8/1972 | F16C/25/04 |
| DE | 2264934 | * 11/1975 | H02K/5/16 |
| DE | 2559837 | 1/1976 | |
| DE | 2514527 | 5/1976 | |
| DE | 8624050 | 8/1987 | |
| DE | 8624050 | * 9/1987 | H02K/5/24 |
| WO | 0013294 | 3/2000 | H02K/5/167 |

\* cited by examiner

Primary Examiner—Thomas M. Dougherty
Assistant Examiner—Hanh N Nguyen
(74) Attorney, Agent, or Firm—Martin A. Farber

(57) ABSTRACT

An electric motor having a stator and a rotor, with the rotor having at least one permanent magnet and one rotor shaft and with the stator having at least two coils which produce a rotating magnetic field when alternating currents flow through them, by which the rotor can be driven, and wherein the rotor shaft is mounted radially and axially. The rotor (4) is mounted by at least one elastic thrust ring (1*a*, 1*b*), with one thrust ring (1*a*) being arranged axially on one side of the rotor (4).

22 Claims, 3 Drawing Sheets

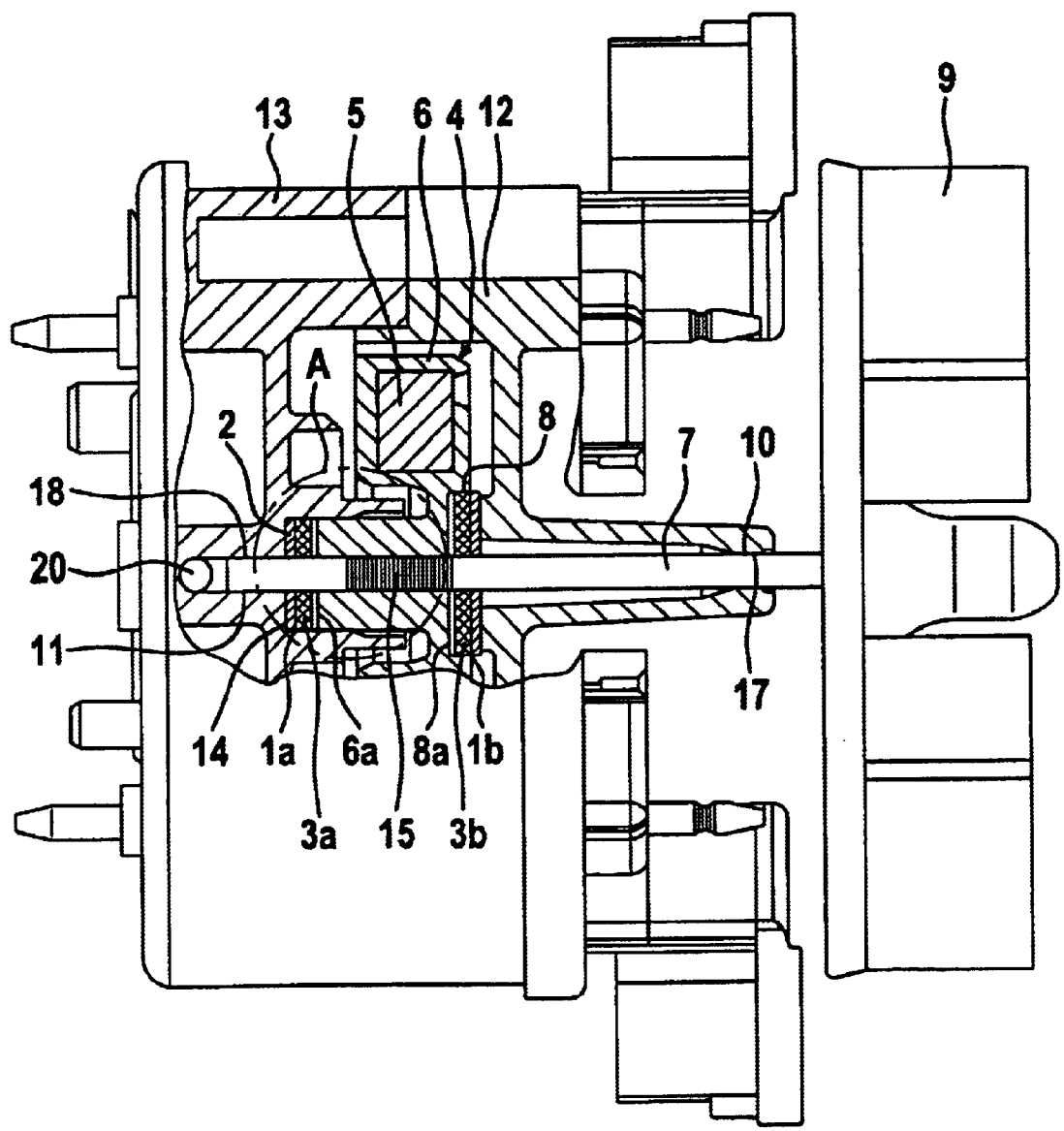

ELECTRIC MOTOR, IN PARTICULAR A FAN MOTOR

FIELD AND BACKGROUND OF THE INVENTION

The invention relates to an electric motor having a stator and a rotor, with the rotor having at least one permanent magnet and a rotor shaft being mounted radially and axially, and with the stator having at least two coils which produce a rotating magnetic field, by means of which the rotor can be driven, when alternating currents flow through them, in particular for use as a blower fan.

Motors such as these are known from the prior art, whose rotor is produced axially, by means of an axial bearing of the rotor shaft in a sintered bearing. A disadvantage of these motors is that increased wear between the sintered bearing and the rotor shaft initially causes a high level of noise emission, then leading to total failure of the motor. The object of the invention is thus to specify a motor which has a long life while at the same time producing low noise emissions.

SUMMARY OF THE INVENTION

According to the invention, this object is achieved in that the rotor is mounted by means of an elastic thrust ring, with the thrust ring being arranged axially on one side of the rotor. This axial bearing results in permanent axial bearing.

The motor can be used in any position, if a second elastic thrust ring is arranged axially on the other side of the rotor. Depending on its current position, the rotor can thus load the first or second thrust ring continuously, or the first and second thrust ring alternately. Furthermore, the elasticity of the thrust rings prevents impact noise since, when the load on the thrust rings is changed, the elastic thrust rings damp out any striking of the rotor in a sprung manner.

Elastic thrust rings which are composed of a rubber-like plastic matrix and to one side of which microfibers are applied are particularly preferable. These thrust rings have a particularly long life, since the microfibers do not become detached from the plastic matrix. If the microfibers are arranged distributed stochastically on the plastic matrix, this avoids any comb effect even when the motor rotates continuously in one direction.

The use of a lubricant in the elastic thrust ring results in even lower friction drag on the respective thrust ring, so that the rotor can reach a high rotation speed, thus floating on the elastic thrust ring and hence further reducing the wear coefficients.

A low-viscosity lubricant is particularly preferable in this case, since this results in particularly lower friction drag on the thrust rings.

If a recess is formed in the stator in order to accommodate the thrust rings, this makes it possible to reliably prevent lubricant from emerging in specific regions of the motor.

It is likewise possible to arrange one or more elastic thrust rings in a respective indentation in the rotor. A conical configuration of the recess or indentation in the stator or in the rotor, respectively, makes it possible for the lubricant which emerges from the elastic thrust ring when the latter is loaded to gather at points provided for this purpose and to be sucked up from there once again when the load is removed from the elastic thrust ring.

A stop in the stator, by means of which the axial movement of the rotor shaft can be limited when additional components are being mounted on the rotor shaft, makes it possible for the components to be pressed axially onto the rotor shaft without the elastic thrust rings being excessively compressed and hence without destroying the structures of the thrust rings and limiting the amount of lubricant forced out of the elastic thrust rings.

A capillary gap in order to accommodate lubricants sucks up lubricants which are forced out during operation and/or assembly. When the load on the thrust ring is removed, the thrust ring can absorb the lubricant once again, due to the capillary effect.

Particularly simple radial bearing can be achieved by the rotor shaft being polished in the region of the radial bearing points.

The rotor can be produced particularly easily if the permanent magnet is embedded in plastic.

The motor can be designed to be particularly compact if the stator is designed as a winding body with coils which are fit on it, and if the rotor is arranged inside the winding body.

The abovementioned physical form can be produced particularly easily if two crossing coils are fit on the winding body.

If there is a phase separation between the alternating currents in the individual coils which corresponds to the angle of orientation of the individual coils to one another, the motor efficiency is high.

If the alternating currents are additionally sinusoidal, this results in the motor running particularly quietly, with little vibration.

Its quiet running characteristics mean that the motor described above is particularly suitable for operation as a fan motor with a fan impeller mounted on the rotor shaft.

BRIEF DESCRIPTION OF THE DRAWINGS

The invention will be explained in more detail in the following text with reference to the figures and for a particularly preferable exemplary embodiment. In the figures:

FIG. 3 shows a view and a partial section of a particularly preferred motor with the fan impeller detached and with a rotor from FIG. 2 and thrust rings from FIG. 1

DETAILED DESCRIPTION OF THE PREFERRED EMBODIMENT

An elastic thrust ring 1 has a rubber-like plastic matrix 2, composed of soft PVC for example, to one side of which microfibers 3, composed of cut nylon flock for example, are applied which are preferably distributed stochastically. This means that there is no comb effect when they are passed over continuously in one direction. The fibers are repeatedly raised and form small capillaries, which are particularly suitable for absorbing liquids. It is also possible to use a simple felt disk, which may be closed on one side, provided the requirements are not too stringent.

Figure 1:
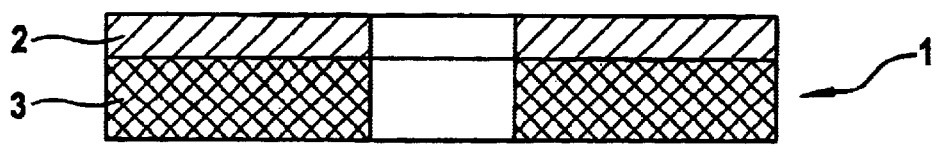
FIG. 1 shows a section through a particularly preferred thrust ring
Figure 2:
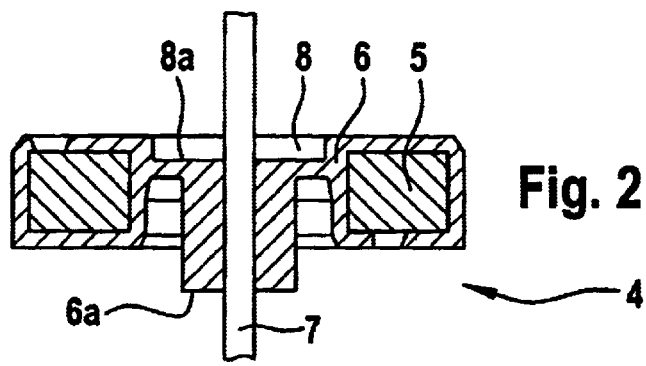
FIG. 2 shows a partial section through a particularly preferred rotor

In FIG. 2, a rotor 4 has a rotationally symmetrical annular permanent magnet 5, which is connected via a magnet mounting 6 composed of plastic to a rotor shaft 7. The magnet mounting 6 has a thrust surface 6a at one of its axial ends. At its other axial end, the magnet mounting 6 has an indentation 8 in order to at least partially accommodate an elastic thrust ring 1 with a thrust surface 8a.

Figure 5:
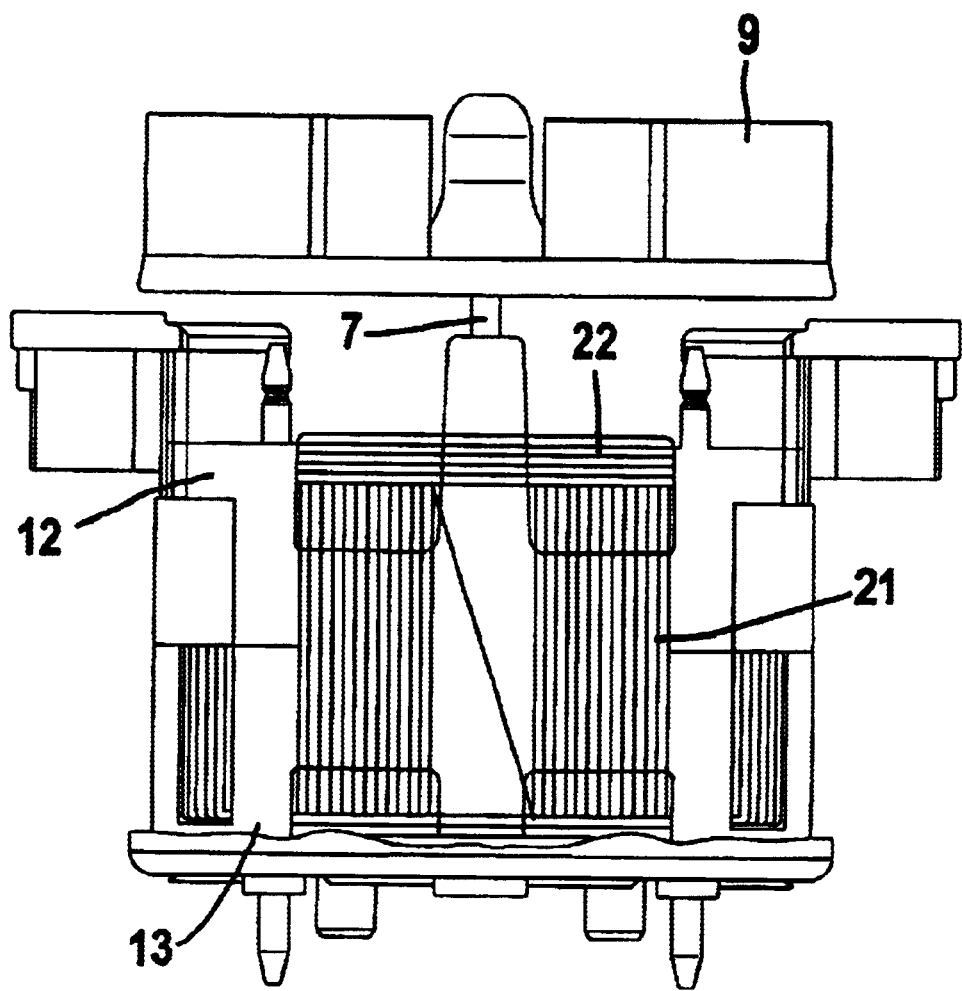
FIG. 5 shows schematically part of a stator winding disposed in a plane parallel to the plane of the figure, and part of a stator winding disposed in a plane perpendicular to the plane of the figure.

In FIG. 3, the rotor 4 from FIG. 2 is provided with a fan impeller 9 and is mounted radially in bearing regions 10, 11 of a stator which is designed as a winding body and comprises a winding body upper part 12 with a coil 22 (shown in FIG. 5) and a winding body lower part 13 with a coil 21 (shown in FIG. 5) Axially, the rotor 4 is mounted in a floating manner via two thrust rings 1b and 1a respectively, in the indentation 8 in the rotor 4 and in a recess 14 in the winding body lower part 13. The coil 21 crosses the coil 22.

The permanent magnet 5 which is embedded in the magnet mounting 6 is pressed onto the rotor shaft 7. A roughened region 15 is applied in the corresponding joint region of the rotor shaft 7, in order to enhance the firm seat. The rotor shaft 7 is polished in regions of the radial mounting 17, 18 in the winding body 12, 13, in order to reduce the friction.

The thrust rings 1a, 1b are arranged in the recess 14 and in the indentation 8 such that the sides with the microfibers 3a, 3b face the thrust surfaces 6a, 5a formed on the magnet mounting 6 on the rotor 4. The relative movement takes place between the respective fiber side 3a, 3b of the thrust ring 1a, 1b and the rotor 4 with the thrust surfaces 6a, 6b. The thrust rings 1a, 1b are fixed with respect to the stator, which is in the form of the winding bodies 12, 13, when under load. This is achieved by the coefficient of friction between the rubber-like plastic matrix 2 and the stator being higher than that between the microfibers 3 and the rotor 4.

Low-viscosity lubricant is introduced into the fibers of the thrust rings 1a, 1b.

The rotor 4 may also be composed completely of magnetic material.

Figure 4:
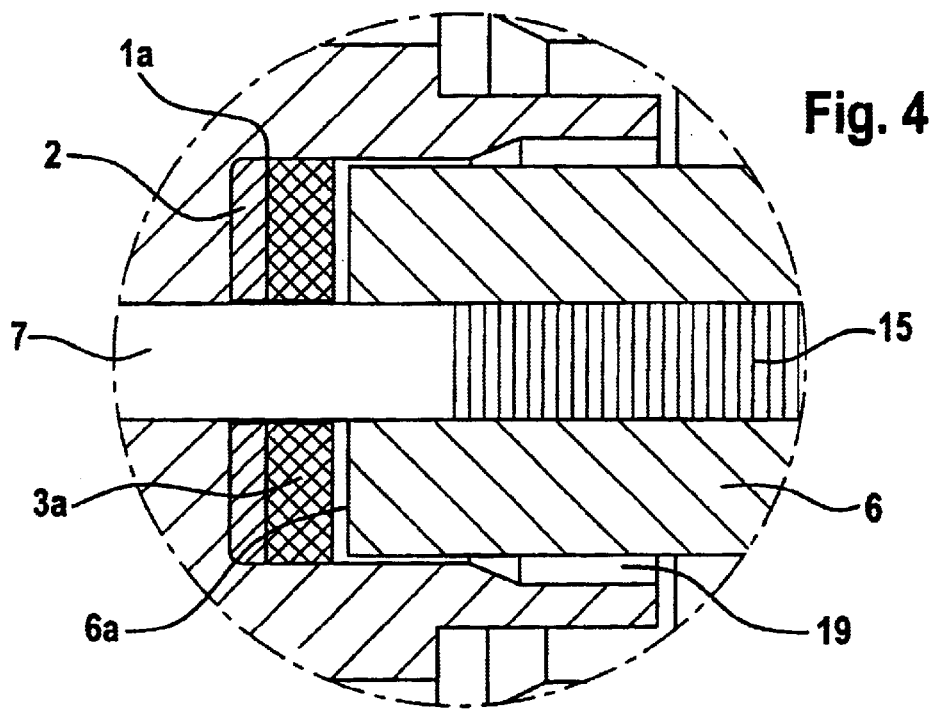
FIG. 4 shows the partial section A from FIG. 3

FIG. 4 shows a capillary gap 19, which can hold lubricant which is forced out of the thrust ring 1a.

The motor can be installed in any desired position, so that, depending on the application, the axial contact force is passed via the thrust ring 1a or 1b into the thrust surface 6a or 8a. If installed horizontally, both thrust rings 1a, 1b are loaded alternately.

In order to fit the fan impeller 9 or other functional elements onto the rotor shaft 7 a very high axial force must be applied, once, to the rotor. During this procedure, the thrust ring 1a is compressed until the shaft abuts against a stop 20 which is in the form of a metal ball. Provided it is sufficiently stiff, stop 20 may also be formed from the plastic of the stator, which is in the form of the winding bodies 12, 13. The pressing-on forces are now absorbed by the stop 20, and not by the thrust ring 1a and the magnet mounting 6.

The lubricant which is forced out by the compression can enter the capillary gap 19. Once the pressing-on process has been completed, load is removed from the thrust ring 1a, and the lubricant located in the capillary gap 19 is sucked back into the fibers 3a of the thrust ring 1a.

In the indentation 8, the bearing is protected against loss of lubricant firstly by the capillary effect of the fibers 3b as described above and secondly by the arrangement of the thrust ring 1b in the indentation 8 in the rotor 4. Any lubricant which may emerge due to rotation gathers here in the corner contour of the indentation 8 and, when the motor is stationary, can migrate back again into the fibers 3b of the thrust ring 1b by virtue of the capillary effect.

We claim:

1. An electric motor having a stator and a rotor, with the rotor having at least one permanent magnet and one rotor shaft and with the stator having at least two coils which produce a rotating magnetic field when alternating currents flow through said two coils, by which the rotor is drivable, and the rotor shaft is mounted radially take out and axially, wherein the rotor (4) is mounted by a first elastic thrust ring and a second elastic thrust ring (1a, 1b), with the first thrust ring (1a) being arranged axially on a first side of the rotor (4) and the second thrust ring (16) being arranged axially on a second side of the rotor to mount the rotor axially in a floating manner, and wherein at least one of the first and the second sides of the rotor terminates in a flat surface that is perpendicular to an axis of rotation of the rotor and abuts a first surface of a corresponding one of the first and the second thrust rings upon an axial movement of the rotor toward the corresponding one of the thrust rings, and wherein the stator has a flat surface that abuts a second surface of the corresponding thrust ring to oppose the axial movement of the rotor.

2. The electric motor as claimed in claim 1, wherein the thrust rings (1, 1a, 1b) comprise a rubber-like plastic matrix (2) to one side of which microfibers (3, 3a, 3b) are applied.

3. The electric motor as claimed in claim 2, wherein the side with the microfibers (3, 3a, 3b) faces the rotor (4).

4. The electric motor as claimed in claim 2, wherein the microfibers (3, 3a,3b) are distributed stochastically.

5. The electric motor as claimed in claim 1, wherein a lubricant is provided in the thrust rings (1, 1a, 1b).

6. The electric motor as claimed in claim 5, wherein the lubricant in the thrust rings (1, 1a, 1b) has a low viscosity.

7. The electric motor as claimed in claim 1, wherein at least the first thrust ring (1a) is arranged in a recess (14) in the stator.

8. The electric motor as claimed in claim 7, wherein the recess (14) and an indentation (8) in the stator and in the rotor (4), respectively, are in a form of truncated cones.

9. The electric motor as claimed in claim 1, wherein the stator (12, 13) has an axial stop (20), and wherein by said axial stop and axial movement of the rotor shaft (7), is limitable by said axial stop by absorbing the pressing on forces by the axial stop (20) when additional components are mounted on the rotor shaft (7).

10. The electric motor as claimed in claim 1, wherein the rotor shaft (7) is polished in a radial bearing region (10, 11).

11. The electric motor as claimed in claim 1, wherein the rotor (4) has a permanent magnet (5) embedded in a magnet mounting (6).

12. The electric motor as claimed in claim 1, wherein said electric motor has a rotationally symmetrical magnet which is rigidly connected to the rotor shaft (7).

13. The electric motor as claimed in claim 1, wherein the stator is in a form of a winding body (12, 13).

14. The electric motor as claimed in claim 13, wherein at least two crossing coils are mounted on the winding body.

15. The electric motor as claimed in claim 14, wherein the alternating currents in individual of said coils have a phase separation which corresponds to an angle of orientation of the individual coils with respect to one another.

16. The electric motor as claimed in claim 15, wherein the alternating currents are sinusoidal.

17. The electric motor as claimed in claim 1, wherein a fan impeller (9) is mounted on the rotor shaft.

18. The electric motor as claimed in claim 17, wherein the fan impeller (9) is pressed onto the rotor shaft (7).

19. An electric motor having a stator and a rotor, with the rotor having at least one permanent magnet and one rotor shaft and with the stator having at least two coils which produce a rotating magnetic field when alternating currents flow through said two coils, by which the rotor is drivable, and the rotor shaft is mounted radially take out and axially, wherein the rotor (4) is mounted by a first thrust ring (1*a*) arranged axially on one side of the rotor (4), wherein a second thrust ring (1*b*) is arranged on another side of the rotor (4), and, depending on position of said rotor, the rotor (4) either loads the first or second elastic thrust ring (1*a*, 1*b*) continuously, or loads the first and second thrust ring (1*a*, 1*b*) alternately, and wherein at least one of the first and the second sides of the rotor terminates in a flat surface that is perpendicular to an axis of rotation of the rotor and abuts a first surface of a corresponding one of the first and the second thrust rings upon an axial movement of the rotor toward the corresponding one of the thrust rings, and wherein the stator has a flat surface that abuts a second surface of the corresponding thrust ring to oppose the axial movement of the rotor.

20. An electric motor having a stator and a rotor, with the rotor having at least one permanent magnet and one rotor shaft and with the stator having at least two coils which produce a rotating magnetic field when alternation currents flow through said two coils, by which the rotor is drivable, and the rotor shaft is mounted radially and axially, wherein the rotor (4) is mounted by at least one elastic thrust ring (1*a*, 1*b*), with a first thrust ring (1*a*) being arranged axially on one side of the rotor (4), wherein the rotor (4) has at least one indentation (8) to accommodate a second thrust ring (1*b*).

21. The electric motor as claimed in claim 20, wherein a recess (14) and the indentation (8) in the stator and in the rotor (4), respectively, are in a form of truncated cones.

22. An electric motor having a stator and a rotor, with the rotor having at least one permanent magnet and one rotor shaft and with the stator having at least two coils which produce a rotating magnetic field when alternating currents flow through said two coils, by which the rotor is drivable, and the rotor shaft is mounted radically and axially, wherein the rotor (4) is mounted by at least one elastic thrust ring (1*a*, 1*b*), with a first thrust ring (1*a*) being arranged axially on one side of the rotor (4), wherein a capillary gap (19) for holding lubricant is provided between the rotor (4) and the stator (12, 13).

* * * * *